J. A. WIEDERSHEIM.
FENDER FOR CARS AND OTHER VEHICLES.
APPLICATION FILED SEPT. 16, 1909.
946,180.
Patented Jan. 11, 1910.
2 SHEETS—SHEET 1.
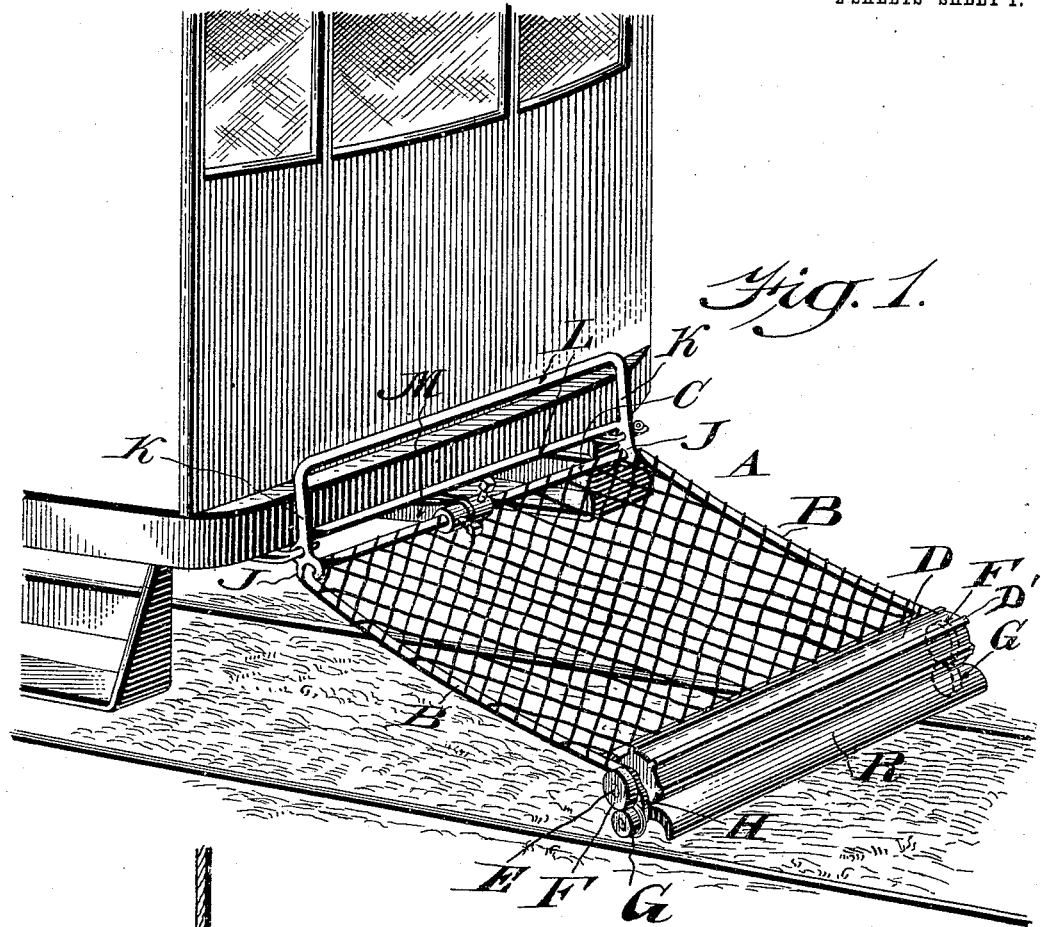
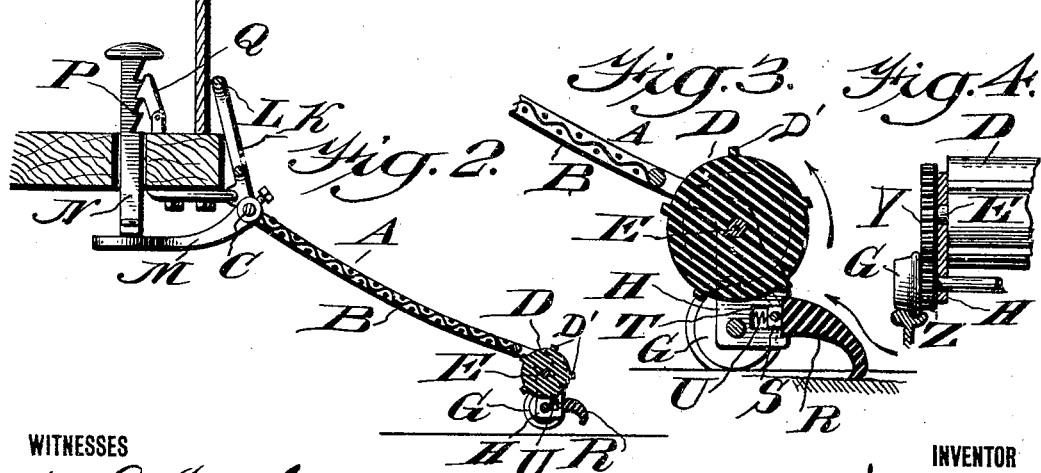
WITNESSES
INVENTOR J. A. WIEDERSHEIM.
FENDER FOR CARS AND OTHER VEHICLES.
APPLICATION FILED SEPT. 16, 1909.
946,180.
Patented Jan. 11, 1910.
2 SHEETS—SHEET 2.
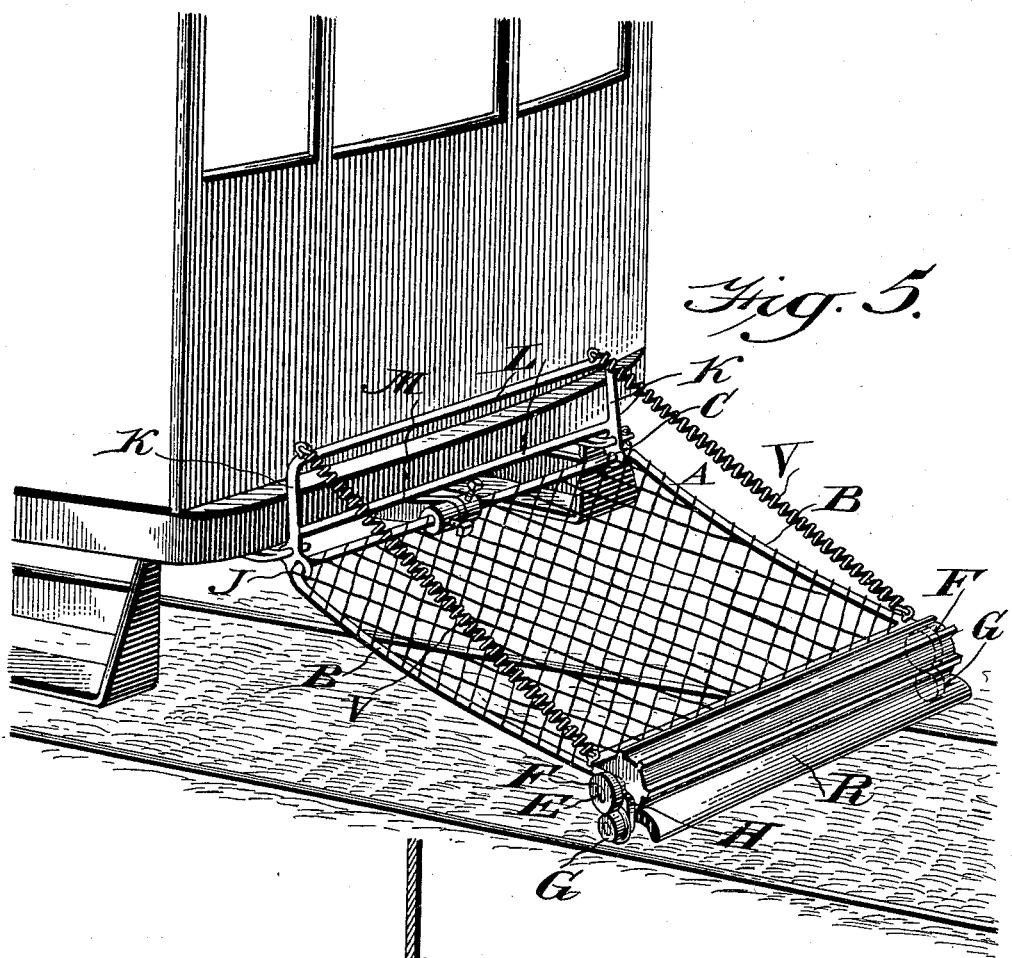
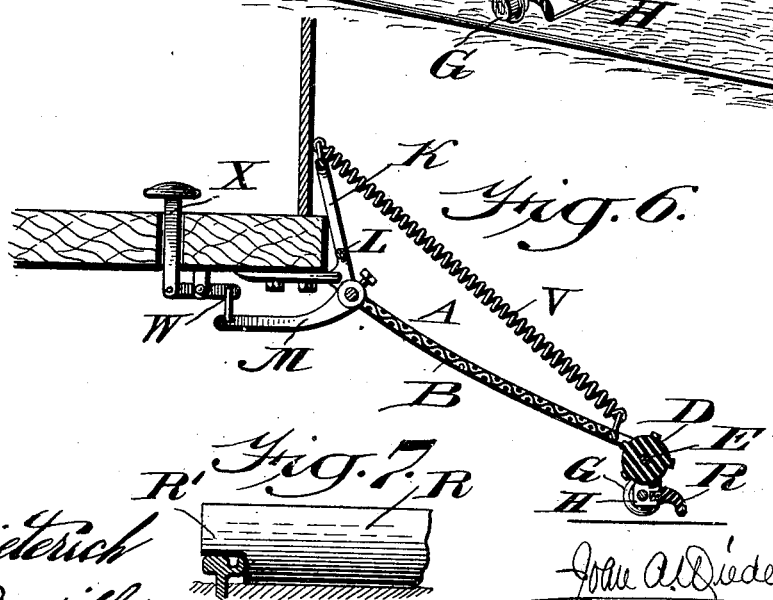

UNITED STATES PATENT OFFICE.

JOHN A. WIEDERSHEIM, OF PHILADELPHIA, PENNSYLVANIA.

FENDER FOR CARS AND OTHER VEHICLES.

946,180. Specification of Letters Patent. Patented Jan. 11, 1910.

Application filed September 16, 1909. Serial No. 517,981.

*To all whom it may concern:*

Be it known that I, JOHN A. WIEDERSHEIM, a citizen of the United States, residing in the city and county of Philadelphia, State of Pennsylvania, have invented a new and useful Fender for Cars and other Vehicles, of which the following is a specification.

My invention consists of a fender for a car or other vehicle, provided with a rotatable pick-up, and means engaged therewith, whereby said pick-up may be actuated by a railroad rail, a road bed, a street or roadway, so as to be operated to throw a person (or other object) struck by the same toward the net or body of the fender and reliably land him or her safely therein without liability to slip back over the pick-up and slide down to the front of the fender or forward thereof.

It consists further of a guard at the front of the fender, the same being normally elevated, but adapted to be lowered and brought close to the rails or road bed or both, and acts as a wiper thereon so as to prevent any existing or comparatively existing space between said guard and the rails and road bed, whereby a person that may be struck will not be caught under the fender, but be directed on said guard as an upwardly existing inclined plane toward the net or body of the fender.

For the purpose of explaining the invention, the accompanying drawings illustrate a satisfactory reduction of the same to practice, but the important instrumentalities thereof may be varied, and so it is to be understood that the invention is not limited to the specific arrangement and organization shown and described.

Figures 1 and 5 represent perspective views of car fenders embodying my invention. Fig. 2 represents a partial side elevation and partial longitudinal section of a portion of the construction shown in Fig. 1. Fig. 3 represents a section of members shown in Fig. 2 on an enlarged scale. Fig. 4 represents a section of a form of gearing that may be employed in lieu of certain members shown in the other figures. Fig. 6 represents a partial side elevation and partial longitudinal section of the construction shown in Fig. 4. Fig. 7 represents a front view of a portion of another form of the shoe.

Similar letters of reference indicate corresponding parts in the figures.

Referring to the drawings:—A designates the body of a fender, the same consisting of a frame composed of the sides B and rear C of said body, said rear constituting a rock shaft, as will be more fully hereinafter referred to. Mounted on the front of said sides B is the transversely extending roller D, which is formed of elastic, flexible or other pliable material, its journals or gudgeons E having secured therewith the rollers F, with which frictionally engage the rollers G, which are mounted on the bearings H connected with the front of the body A, said rollers G acting as pilot wheels for the fender and being adapted to run on the rails of car tracks, so as to receive motion therefrom and communicate the same to the rollers F and consequently to the roller D. On the roller D are ribs D' which project outwardly from the surface of the roller and extend in the transverse direction thereof, being formed also of elastic, flexible or other pliable material.

The frame of the body A by its rock shaft C, is pivotally mounted on ears J, which are formed with or otherwise secured to the hangers K, the latter being strengthened by the braces L, said frame being adapted to turn in said ears and permit the fender to rise and fall axially, the normal position of the fender being such that the roller D is elevated and with it the rollers F, G, above the rails so as not to contact therewith, whereby said roller D under normal conditions is passive or remains at rest, this being occasioned by the elevated position of the front of the body A.

In order to retain the body A with its appurtenances in said position, there is connected with the rock shaft C the rearwardly-extending arm M, on which is rested the vertically movable foot piece N, the latter being fitted in the floor of the platform of a car or other vehicle and adapted to be prevented from rising by means of the ratchet P on said piece N and the dog Q which is mounted adjacent thereto, whereby when said dog is thrown out, the piece N is released of the same, and as the arm and consequently the fender are no longer controlled by said piece N, the fender drops and the rollers G are placed thereby on the rails and receive rotary motion therefrom, thus being communicated to the roller D, when the latter is rotated in the direction of the arrow, Fig. 3.

Connected with the bearings H, is the shoe R, which extends across the front of the body of the fender under the roller D and somewhat forward of the same, it being formed of elastic, flexible, or other pliable material, and constituting the primary guard of the fender. The front edge of this shoe is curved or bent downwardly so that its forward edge projects toward the ground instead of projecting forwardly. By this construction, the forward free edge of the shoe when meeting an obstruction is bent rearwardly and wipes the ground and is prevented from rising and hence does not pass over the obstruction but causes it to ascend the shoe and be directed to the pick-up.

On the rear ends of the shoe are the sliding blocks S, which occupy positions in elongated slots T in the bearings H. In said slots also are the springs U, which bear against the backs of the blocks and form cushions for the latter, as well as for said shoe R, and which are operative when the shoe receives motion rearwardly.

It will be noted upon reference to the different figures of the drawing that the axis of the roller D is above and substantially in vertical alinement with the shaft of the rollers G and that the rollers F and G are in contact with each other, one above the other at all times whether in their active or inactive positions. By this means, the shoe R is always in position in proximity to the roller D and the ribs of the latter are disposed directly above said shoe at the forward or advance side of the roller.

In practice, the shoe is tapering from rear to front so that the front is somewhat thinned or reduced and thereby rendered more sensitive, as will be hereinafter referred to.

The operation is as follows, the parts being in position shown in Figs. 1 and 2, and the car or vehicle in motion, the roller D, however, being at rest:—When a person is in the path of the fender and liable to be struck, the motorman or driver quickly releases the foot piece N, when the fender drops in front by gravity and places the rollers G on the rails, whereby said rollers are rotated and their motion is communicated to the rollers F, and consequently to the roller D. The shoe R is also lowered with the fender and its front portion positively brought close to the rails and road bed or street and somewhat bent-under rearwardly, so as, in a measure, to wipe the rails and bed and prevent the existence of any space between the shoe and said rails and the bed or street, while the upper face of the shoe is inclined or rises from front to rear and consequently to the roller D. Should now a person be struck by the shoe and be thrown down, the shoe will reach under the same and serve to deflect or guide him or her upwardly thereon toward the roller D, when the ribs of the latter will take hold of or pick up the person and land him or her into the net or body of the fender, the effect of which is evident, it being noticed that said ribs effectively convey the person over the roller toward and into said net, and prevent the same from slipping back over said roller to or forward of the front of the fender.

In Figs. 5 and 6, I show the fender held in front normally above the rails by means of the springs V, which are connected with the front of the body A and a fixed member in rear. In this case, the arm M is adapted to be raised by the action of the levers W, and the foot piece X, which latter is operated downwardly by the motorman or driver, so that when said piece is depressed, said arm is raised, the springs V are expanded or overcome, the front of the fender is lowered and the rollers G are engaged with the rails as before, whereby the roller D receives motion, this being occasioned as long as the piece X is controlled downwardly by the motorman. When said piece is let-go, the springs V contract and are again operative to raise the fender from in front, the arm M, the levers W and the foot piece X then returning to their normal positions.

If desired, the friction rollers F, G may be substituted by the gear wheels Y, Z, in which case the gear wheels Z are connected with rollers or pilot wheels G and mesh with the gear wheels Y, which are connected with the axis, journals or gudgeons E of the roller D.

It will be understood that when the shoe strikes the person, it yields rearwardly, and when the person drops on said shoe and on the rollers, said members act as buffers, whereby the force of the blow and fall is greatly broken, thus avoiding material injury to the person.

While I have used the terms railroad rails and road bed, it is to be understood that where the fender is applied to a vehicle other than a car, locomotive, etc., which run on rails, the rollers G may be engaged with a street or roadway and so be rotated for operating the roller D, as hereinbefore stated.

The fender is adapted to be connected with a car or other vehicle in any suitable manner, and it may be removed therefrom and folded thereon, as desired.

If it is desired to have the pilot wheels always on the rails, roadbed, etc., so that the roller D will be rotated continuously, the fender will be lowered to the required extent for such purpose. In this case, the means for controlling the elevation and descent of the fender may be dispensed with.

In Fig. 7, I show the shoe R cut away, as at R′, so as to rest on and act as a wiper for the rail and cover the roller G in front of the same, but the main portion of said shoe may descend to the road bed, street, or roadway, the same as in Fig. 3.

Having thus described my invention, what I claim as new and desire to secure by Letters Patent, is:—

1. A fender provided with a rotatable pick-up, and means geared therewith, the axes of said means and pick-up being in vertical alinement and said means being adapted to engage a road, whereby the pick-up receives rotary motion in a direction contrary to that in which the vehicle is traveling.

2. A fender provided with a rotatable pick-up, and mechanism disposed in vertical alinement with the latter and adapted to be operated by contact with a road for actuating said pick-up, said pick-up having thereon a transversely extending rib, the same projecting outwardly from the surface thereof.

3. A fender provided with a rotatable pick-up, and mechanism disposed in vertical alinement with said pick-up and adapted to be operated by contact with a road for actuating said pick-up on the propulsion of the vehicle to which the fender is applied, said pick-up having thereon a transversely extending rib, the same projecting outwardly from the surface thereof.

4. A fender provided with a rotatable pick-up, mechanism disposed in vertical alinement with said pick-up and adapted to engage therewith and to contact with a road, whereby when the vehicle to which the fender is applied is in motion, said pick-up receives rotary motion in a direction toward the body of the fender, and a deflector carried by the body of the fender in front of said pick-up.

5. A fender provided with a rotatable pick-up, a rotatable member disposed in vertical alinement with said pick-up and adapted to engage with said pick-up and contact with a road and be rotated by the propulsion of the vehicle to which the fender is applied, and a deflector carried by the body of the fender in front of said pick-up.

6. A fender provided with a rotatable pick-up, means on the former adapted to operatively rotate said pick-up, said pick-up and rotatable means being disposed in vertical alinement with each other a member of said means being adapted to engage a road, whereby it is rotated by the propulsion of the vehicle to which the fender is applied, and a deflector carried by the body of the fender in front of said pick-up.

7. A fender provided with a rotatable pick-up, normally elevated and at rest, means for lowering said fender, means in vertical alinement with and engaged with said pick-up adapted to contact with a road, whereby when the vehicle is in motion said pick-up is operatively rotated, and a deflector carried by the body of the fender in front of said pick-up.

8. In a fender, a rotatable pick-up mounted thereon, a roller connected therewith, a pilot wheel mounted on the fender in vertical alinement with and engaging said roller, supporting means for the fender, whereby it may be lowered, and place said pilot wheel on a road and rotate said pick-up by the propulsion of the vehicle to which the fender is applied, and a deflector carried by the body of the fender in front of said pick-up.

9. A fender provided at the front thereof with a transversely extending slidingly mounted shoe which is formed of pliable material having its forward free edge projecting downwardly and adapted to be placed on a road and bent rearwardly to wipe said road.

10. A fender provided at the front thereof with a transversely extending shoe which is formed of pliable material and normally elevated with the fender with its forward end projecting downwardly, and means whereby the fender may be lowered and said shoe positively placed on a road to wipe the same.

11. A fender provided at the front thereof with a transversely extending slidingly mounted shoe, a bearing therefor, and means whereby the shoe is movably supported on said bearing.

12. A fender embodying a rotatable pick-up and friction rotating means in vertical alinement therewith, said fender being provided at the front thereof with a transversely extending horizontally slidable shoe, a bearing therefor, the latter having a slot therein, a block on the end of said shoe, said block slidingly occupying said slot, and a resilient backing for said block.

13. A fender provided at the front thereof with a transversely extending shoe of pliable material with the forward edge inclined downwardly adapted to positively contact with the road or roadbed and thereby bend downwardly and rearwardly to wipe the road.

14. A fender provided with a rotatable pick-up, means geared therewith adapted to engage a road whereby the pick-up receives rotary motion in a direction contrary to that in which the vehicle is traveling, and a shoe in advance of and below said pick-up having its forward edge projecting downwardly, said shoe being of pliable material and adapted to bend rearwardly and wipe the ground when meeting an obstruction.

JOHN A. WIEDERSHEIM.

Witnesses:
 HARRY C. DALTON,
 C. D. McVAY.